Patented Mar. 28, 1950

2,502,344

UNITED STATES PATENT OFFICE 2,502,344

DELTA-(5-CARBOXY-2-THIENYL)-VALERIC ACID AND ESTERS

Hans Reinhard Rosenberg, Bound Brook, N. J., and Carlton Webster Croco, Swarthmore, Pa., assignors to E. I. du Pont de Nemours & Company, Wilmington, Del., a corporation of Delaware No Drawing. Application December 6, 1946, Serial No. 714,642

6 Claims. (Cl. 260—329)

This invention relates to novel organic compounds.

It is an object of this invention to produce novel organic compounds useful as intermediates for the synthesis of pharmaceuticals. A further object is to produce novel organic compounds particularly adapted for use as intermediates in the synthesis of biotin and related compounds. Other and further important objects of this invention will become apparent from the following description.

The novel compounds of this invention may be expressed by the general formula

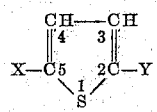

wherein X stands for a radical selected from the group consisting of the nitrile group and radicals derived therefrom by hydrolysis and alkylation; in other words, X designates the radicals CN, COOH and COOR, wherein R is a lower alkyl radical such as methyl, ethyl, isopropyl or butyl. Y in the above formula designates the delta radical of N-valeric acid or an ester thereof such as the methyl, ethyl, propyl or butyl ester. The word "delta" in this nomenclature signifies that the attachment of the valeryl radical to the thienyl radical is in the delta carbon atom of the valeryl radical. Thus, in the case of the free diacid, the compound has the formula

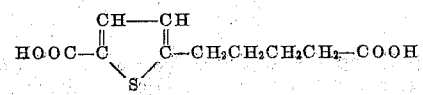

Our novel series of compounds is closely interrelated by a cognate system of synthesis. The initial material in this synthesis is constituted by the delta-(5-halogeno-2-thienyl)-alkyl valerates of copending application of Terry and Croco, Serial No. 637,480, now abandoned. They are prepared in said copending application by reacting with a halogen, such as chlorine, bromine or iodine, upon an alkyl ester of delta-2-thienyl-valeric acid in a suitable solvent, for instance glacial acetic acid. These halogeno compounds, for instance the 5-bromo compounds are first reacted with a metal cyanide, whereby the halogen atom becomes replaced by the CN group. A suitable metal cyanide for this purpose is cuprous cyanide; but alkali-metal cyanides, such as potassium cyanide, may also be used, especially if a copper compound is present in the reaction mass.

The next step in the synthesis comprises alkaline hydrolysis of the cyano ester compound followed by acidification, whereby the free diacid, above formulated, is obtained. This diacid may then be converted into any desirable lower dialkyl ester, by ordinary methods of alkylation, such as reaction with an alcohol in the presence of anhydrous hydrogen chloride, sulfuric acid, boron trifluoride or other esterification catalyst.

Our novel series of compounds are useful as organic intermediates, and are especially fitted as intermediates for the synthesis of biotin and related compounds. This special fitness arises from the fact that our novel compounds are thienyl-valeric acid compounds which have only two free positions in the thiophene ring, namely positions 3 and 4. Consequently, if the compound is converted eventually into a diamine compound, the two amino groups become oriented in definite positions, namely positions 3 and 4. Such diamine compounds, which therefore contain their nitrogen atoms in the same relative positions as in biotin, may be converted by appropriate reactions into biotin and also into new biotin-like compounds not found in nature.

A first step in this further synthesis, as illustrated by Example 4 below, is the nitration of the new compounds, producing a compound probably represented by the formula

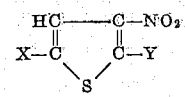

wherein X and Y have the same significance as above.

Without limiting our invention, the following examples are given to illustrate our preferred mode of operation. Parts mentioned are by weight.

*Example 1.—Delta-(5-cyano-2-thienyl)-ethyl-valerate*

A mixture of 291 parts of delta-(5-bromo-2-thienyl)-ethyl-valerate, 90 parts of cuprous cyanide and 79 parts of pyridine was heated at 170–175° C. for four and one-half hours while stirring under a reflux condenser. The hot mass was then poured into 900 parts of aqueous hydrochloric acid (24% HCl) and cooled to 0° C. while stirring. About 440 parts of benzene were added and the mixture was stirred for one hour. The whole charge was then filtered to remove a small amount of solid. The benzene layer of the filtrate was separated and washed with 100 parts of dilute hydrochloric acid and then washed with water. The benzene solution was dried with sodium sulfate; the benzene was distilled off under vacuum, and the product, a colorless liquid, was vacuum distilled at about 1 mm. The fraction boiling at 147-150° C. was collected and had a refractive index of 1.5178 at 25° C.

| Analysis | Found | Calculated for NC.C₄H₂S.C₄H₈.CO.OC₂H₅ |
|---|---|---|
| | Per Cent | Per Cent |
| N | 5.74 | 5.9 |
| S | 13.55 | 13.5 |
| Br | 1.03 | 0 |

Example 2.—Delta-(5-carboxy-2-thienyl)-valeric acid (a) A mixture of 79 parts of ethyl delta-(5-cyano-2-thienyl)-valerate, as obtained in Example 1, 50 parts of potassium hydroxide and 260 parts of water were refluxed for twenty-four hours. The resulting solution was cooled and made acid to Congo Red paper with hydrochloric acid. The precipitate was filtered off and washed with water. The wet cake was crystallized from 400 parts of 50% ethyl alcohol. The white product was filtered off and dried. It had a melting range of 170-172° C.

| Analysis | Found | Calculated for HOOC.C₄H₂S.C₄H₈.COOH |
|---|---|---|
| N per cent | Nil | 0 |
| S per cent | 13.77 | 13.98 |
| Acid No | 477 | 490 |

(b) A mixture of 26 parts of delta-(5-bromo-2-thienyl)-valeric acid, 16 parts of potassium cyanide, 4 parts of copper cyanide, 57 parts of water, 25 parts of ethyl alcohol and 6 parts of potassium hydroxide was heated in a closed vessel at 200° C. for ten hours and then heated at 210° C. for ten hours. After the alcohol and ammonia were removed by boiling, the charge was filtered. The filtrate was acidified with hydrochloric acid. The precipitate was removed by filtration and crystallized from 50% ethyl alcohol and then recrystallized twice from water. The white product had a melting range of 168-172° C. Its mixed melting range with the product from part (a) was likewise 168-172° C.

| Analysis | Found | Calculated for HOOC.C₄H₂S.C₄H₈.COOH |
|---|---|---|
| N per cent | 0.35 | 0 |
| Acid No | 480 | 490 |

Example 3.—Diethyl ester of delta-(5-carboxy-2-thienyl)-valeric acid

Dry hydrogen chloride (about 35 parts) was passed into a solution of 67 parts of delta-(5-carboxy-2-thienyl)-valeric acid in 500 parts of absolute ethyl alcohol and the resulting solution was refluxed for five hours. The charge was poured into 2500 parts of water and 300 parts of benzene were added. After shaking to extract the ester, the benzene layer was separated and washed with dilute sodium carbonate solution to remove any free acid, and then with water. The benzene solution was dried with sodium sulfate. The benzene was distilled off and the residual ester was distilled under a vacuum of about 2 mm., collecting the fraction at 155°-168° C. It presumably constituted the diethyl ester of delta-(5-carboxy-2-thienyl)-valeric acid, and had a refractive index of 1.5050 at 25° C.

Example 4.—Nitration 12 parts of ethyl delta-(5-cyano-2-thienyl)-valerate were added slowly to 92 parts of 96% sulfuric acid at 5-8° C. over a period of ten minutes. 10 parts of mixed acid (33% nitric acid and 67% sulfuric acid) were added slowly to the above solution at 5-9° C., over a period of ten minutes, while stirring, and the mass was then held for 20 minutes longer at 5-8° C. The charge was poured onto ice and the heavy oil was extracted with benzene. The benzene solution was washed with water, then with dilute sodium carbonate solution and finally with water. The benzene was removed under vacuum and 10 parts of a reddish oil remained which had the following analysis, and presumably was ethyl-delta-(5-cyano-3-nitro-2-thienyl)-valerate.

| | Found | Calculated for (NO₂)NC.C₄HS.C₄H₈.CO.OC₂H₅ |
|---|---|---|
| | Per cent | Per Cent |
| Nitrogen | 9.22 | 9.89 |
| Sulfur | 11.28 | 11.35 |

When the above nitro ester was subjected to saponification with potassium hydroxide and water according to Example 2 (a) above and then acidified, delta-(5-cyano-3-nitro-2-thienyl)-valeric acid was obtained.

It will be understood that the details of the above examples may be varied within wide limits without departing from the spirit of this invention. Thus, in the formation of the cyano derivatives, other alkali cyanides beside potassium cyanide may be used, such as sodium cyanide.

In lieu of the bromo-derivative named in the examples, the iodo-derivative can be used. Likewise, other esters than the ethyl ester may be used, for instance the methyl, propyl, butyl, etc.

In the esterification of the diacid, other alcohols, such as methyl, isopropyl, butyl, etc., may be used. Also, esterifying catalysts other than hydrogen chloride can be used, for instance sulfuric acid, boron trifluoride, etc.

We claim as our invention:

1. A compound of the general formula

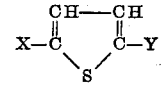

wherein Y represents the delta radical of a compound selected from the group consisting of normal valeric acid and its alkyl esters, while X stands for a radical of the group consisting of CN, COOH and the lower alkyl esters of COOH.

2. An alkyl ester of delta-(5-cyano-2-thienyl)-valeric acid.

3. Delta-(5-cyano-2-thienyl)-ethyl-valerate.

4. Delta-(5-carboxy-2-thienyl)-valeric acid.

5. A dialkyl ester of delta-(5-carboxy-2-thienyl)-valeric acid.

6. The diethyl ester of delta-(5-carboxy-2-thienyl)-valeric acid.

HANS REINHARD ROSENBERG.
CARLTON WEBSTER CROCO.

REFERENCES CITED

The following references are of record in the file of this patent:

Steinkopf: "Die Chemie des Thiophens," Edwards Lithoprint, 1941, page 82.